E. E. GARLAND.
STEMLESS SELF CLOSING VALVE FOR HIGH PRESSURE TANKS.
APPLICATION FILED JUNE 26, 1919.

1,348,708.

Patented Aug. 3, 1920.

WITNESSES
H. C. Hebig
E. B. Gale

INVENTOR
EDWARD E. GARLAND
BY
ATTORNEYS

UNITED STATES PATENT OFFICE.

EDWARD E. GARLAND, OF NEW YORK, N. Y.

STEMLESS SELF-CLOSING VALVE FOR HIGH-PRESSURE TANKS.

1,348,708.  Specification of Letters Patent.  Patented Aug. 3, 1920.

Application filed June 26, 1919. Serial No. 306,927.

*To all whom it may concern:*

Be it known that I, EDWARD E. GARLAND, a citizen of the United States, and a resident of the city of New York, (Port Richmond, Staten Island, borough of Richmond,) in the county of Richmond and State of New York, have invented a new and Improved Stemless Self-Closing Valve for High-Pressure Tanks, of which the following is a full, clear, and exact description.

This invention relates generally to a new and improved valve and more specifically to a stemless, self-closing valve particularly adapted for use in connection with high pressure gas tanks.

In valves heretofore used on gas tanks wherein a high pressure is used, for example, around 1800 to 2000 pounds, as used in oxygen tanks, a valve stem has been embodied in the valve construction. By reason of such a construction a gland or stuffing box has been necessary to permit movement of the valve stem, which construction has been the source of much trouble due to the difficulty of maintaining a tight joint, resulting in the escape of the gas contained.

Another source of difficulty is that the projecting stem of the valve, which of necessity must be manipulated when the tank is to be used or recharged, is frequently broken or seriously damaged, the former requiring replacement and the latter ofttimes resulting in loose packing and a consequent further escape of the gases.

In certain high pressure valve constructions having a projecting stem embodied therein, a protecting cap has been removably positioned on the tank to protect and cover the valve stem and its parts from injury. With such a construction when it is desired to make a connection with a valve outlet to use the gas from the tank, it has been necessary to remove the cover to effect such a connection, thus leaving the valve and the projecting stem still unprotected when in use. When there is no outside connection from the tank to the valve, it is contemplated that the covering shall be positioned over the valve stem to protect the same, but the practical result has ofttimes been that the user has either lost or failed to replace the top, thus leaving the valve stem unprotected and subject to injury and necessitating the replacement of the cap or cover.

In oxygen tanks, it is necessary that the gas should be at least ninety-nine per cent. pure. After the contents of the said tanks have been emptied, the tanks are permitted to stand in the open with the stem valve open, thus permitting moisture or deleterious gases to enter the tank and thus contaminate the relatively pure oxygen which is at a later time forced into the tank.

One of the objects of this invention is to provide a stemless self-closing valve particularly adapted for use in connection with high pressures, which will overcome the above-mentioned objections and difficulties of valves.

Another object of this invention is to provide a valve, particularly adapted for use in connection with high pressures, of simple and rugged construction having few parts, which is constructed without the projecting stem and packing required by the use thereof.

A further object of this invention is to provide a stemless high pressure valve having its parts so constructed and arranged that the valve will be automatically unseated upon the insertion of a nipple therein when a connection is made therewith and which will be self-closing to automatically prevent further escape of gas and to prevent moisture and deleterious gases from finding their way within the tank when the said tank is emptied.

A further object is to provide in a stemless valve a construction in which the valve element is constructed to require a limited movement thereof after the main valve seat has been uncovered in order that the gas may pass therethrough.

A further object is to provide in a high pressure stemless valve a combination with a safety means wherein the various parts of the valve are conveniently arranged to permit the convenient assembly and renewal thereof and to permit the renewal or replacement of the safety means without interfering with the adjustment or setting of the other valve parts.

The above objects are substantially accomplished by providing a casing having, in the preferred form, a cylindrical chamber therein, there being three passages communicating with said chamber, an inlet, an outlet and a passage communicating with the safety head. One end of said chamber is formed with a restricted portion forming a passageway of less diameter than the main chamber, there being positioned within said chamber a valve having one portion extending within the restricted portion and fitting snugly therein, and an enlarged portion extending within the main chamber but being of a smaller diameter than the said chamber so as to move freely therein. The two portions of the valve are connected by a beveled surface which is seated upon a corresponding beveled surface connecting the restricted portion of the chamber and the main portion.

A passage extends inward from the smaller end of the valve and has a turn therein extending laterally of the valve having an opening communicating with the restricted portion of the chamber so that a limited movement of the valve will be required in order to permit gas to escape from the main chamber.

Other objects and advantages will be apparent from the following description and the accompanying drawings showing one of the preferred forms of the invention. Similar characters of reference designate like parts in the several views.

In the drawings showing one of the preferred forms of the invention—

Figures 1, 2:
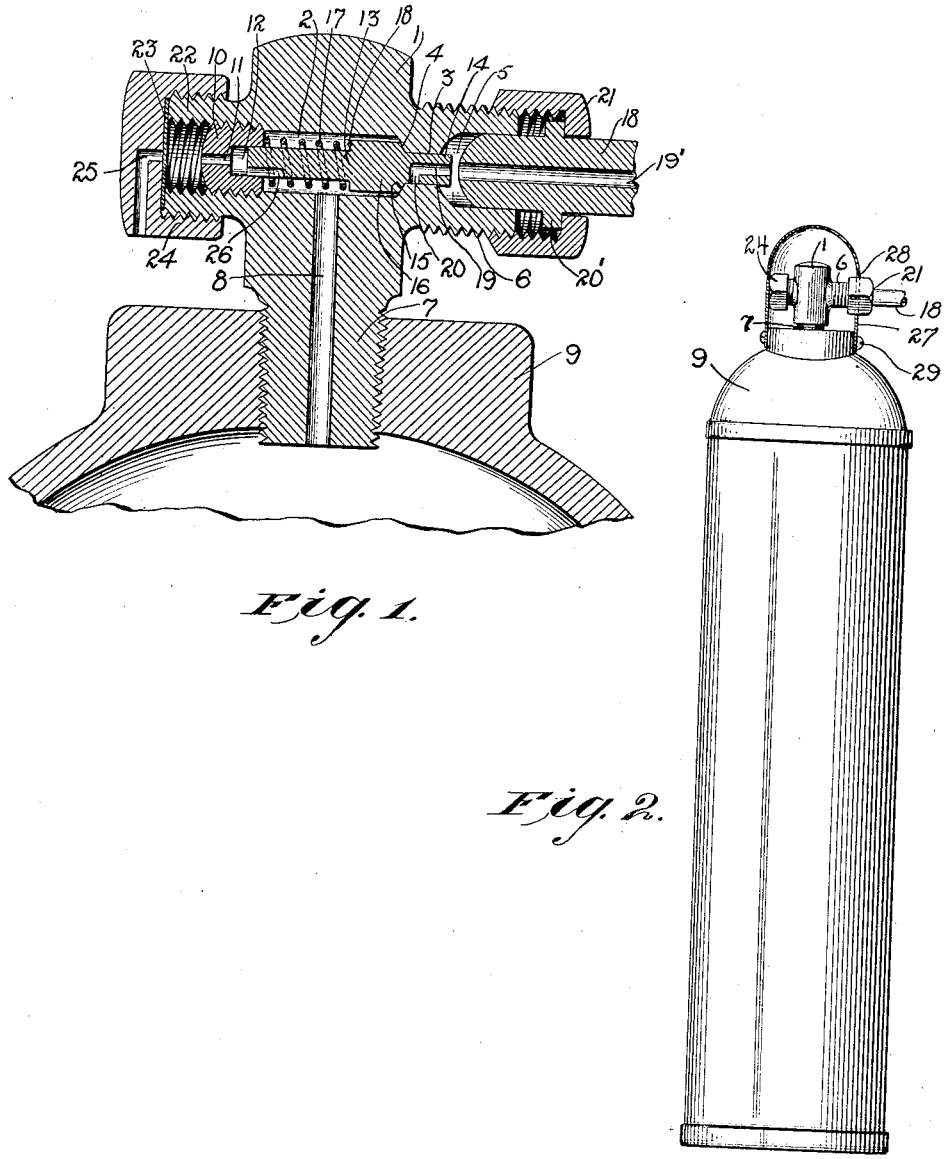
Figure 1 is a sectional view of a stemless valve shown positioned in a container, shown broken away.
Fig. 2 is an elevation view showing the stemless valve positioned in a container and a cover secured thereover showing a coupling connection secured to the outlet of the valve.

In the drawings showing one of the preferred forms of this invention, the valve is shown as comprising a casing 1, which may be of any suitable form and composed of any suitable material, the said casing being provided with a chamber 2 preferably cylindrical in form, the said chamber having at one end thereof a restricted passage 3, there being an annular tapered portion connecting the main chamber 2 and the restricted passage 3 forming a valve seat 4. At the outer end of the restricted passage there is formed an enlarged bore 5.

A neck 6 extends outwardly from the casing 1 and surrounds the bore 5. Another threaded neck 7 projects from the casing angularly with respect to the neck 6, and a passage 8 extends inwardly from the end of the neck being in communication with the chamber 2. The threaded neck 7 may be inserted in a suitable gas receptacle 9.

A plug 10 having a passage 11 extending therethrough is threaded in the casing 1 to substantially form a closure for one end of the chamber 2. The inner end of the plug is recessed as at 12 to form an enlargement of the passage 11, which functions as a guide for one end of the valve body 13. The other end of the valve body fits snugly and is guided within the restricted passage 3 and has the end 14 thereof extending a certain distance beyond the outer end of the restricted passage 3 into the bore 5.

A portion of the valve body 13 intermediate the ends thereof is of a diameter larger than the end portion 14 guided within the restricted passage 3 but smaller than the chamber 2, the two portions 13 and 14 of the valve body forming an annular shoulder 15 which rests on the valve seat 4.

In the preferred form, a means is shown for keeping the valve body 13 seated, the said means comprising a spring 17 having one end thereof seated on the inner end of the plug 10 and the other end abutting against a shoulder 18 of the valve body.

As a means of permitting the gas to pass from the receptacle 9 through the passage 8 to the bore 5, there is provided a longitudinal passage 19 extending inwardly from the end 14 of the valve body, the said passage having a turn 20 therein terminating in the walls of the restricted chamber 3 intermediate the length thereof so that the valve body will require a limited movement to unseat the under shoulder 15 from the valve seat 4 before communication may be had between the chamber 2 and the bore 5.

In order to use the gas a suitable coupling connection may be made, which, in the preferred form, comprises a nipple 18 having an opening 19', extending therethrough to be in alinement with the passage 19 in the valve body having the inner end thereof of a suitable size to fit snugly within the bore 5. The nipple 18 may further be provided with a shoulder 20' so that a suitable coupling nut 21 may be threaded on the neck 6 to move the nipple within the bore the desired distance until the end thereof contacts with the end of the valve body, and in addition thereto moves the valve body a distance sufficient to permit the chamber 20 to be in communication with the main chamber 2.

Another threaded neck 22 extends from the casing 1 and surrounds the threaded plug 10, the outer end of said plug being substantially flush with the end of the neck.

As a means of preventing excessively high pressures, there is provided a safety device which comprises essentially a disk 23 of a suitable thickness and composed of a suitable material which will depend upon the highest pressure to be guarded against, the said disk being positioned at the end of the plug 10 to close the end of the passage 11 extending therethrough, the disk being there held, in the preferred form, by a nut 24 threaded on the neck 22.

The nut 24 is provided with a passage 25, one end thereof being closed by the disk 23 and positioned in alinement with the passage 11, the other end of said passage 25 communicating with the atmosphere. The end of the valve body guided in the end of the plug 10 is provided with a passage 26 which permits communication at all times between the chamber 2 and the passage 11. It is thus seen that the disk 23 is at all times subject to the pressure in the gas receptacle so that if an excessive pressure is formed therein, instead of such pressure bursting the valve or container, a portion of the disk 23 will be ruptured, thus releasing the excessive pressure within the container and valve.

In the present day practice the valve used in the high pressure oxygen tanks are provided with a projecting stem and it has been the practice to provide a protective covering for the valve when positioned on the container. However, when it is desired either to refill the gas receptacle or to exhaust the gas therefrom, it has been necessary to remove the cover. It has been found in practice, however, that if for any reason the cover is removed, it is not always replaced. In such a case the valve is left unprotected and a financial loss is incurred in replacing the cover.

In the applicant's construction a cover 27 may be provided having an opening 28 therein through which the coupling nut 21 and nipple 18 may be inserted so that the nut 21 may be threaded on the neck 6. The cap 27 may be fixed to the gas container 9 in a semi-permanent manner by screws 29 or other suitable means, it being unnecessary to remove the cover either to withdraw the gas from the container 9 or to recharge the container, because it is seen from the construction of the valve that when a nipple 18 is inserted within the bore 5, either for purposes of exhausting the container or recharging the container, that upon a predetermined movement of the valve body, communication may be had with the interior of the container. The opening 28 in the cover 27 is positioned relative to the threaded neck 6 to permit the coupling nut 21 to be inserted in the opening so that the nut 21 may be threaded on the neck 6 to properly position the nipple 18 within the bore 5.

Valves of this type are used with gases having a pressure as high as 1800 or 2000 pounds per square inch so that it is essential to have a valve constructed to prevent the escape of gas when the valve is seated.

In the construction shown the seating of the valve body 13 upon the annular beveled seat 4 in addition to the closure formed by the walls of the restricted chamber 3 for the passage 20, there is provided an arrangement which serves to prevent the escape of high pressure gases. By positioning the disk 23 as shown, in addition to serving as a safety device, the said disk serves as a gasket to form a gas-tight connection at that point. If the safety disk is ruptured, it may readily be replaced by merely removing the nut 24 without interfering with the assembly or adjustment of the other parts of the valve.

When the stemless valve is applied to a gas container, which is fully charged, the pressure of the gas acting against the valve body will tend to normally keep it closed so that under such conditions a spring would not be needed. However, when the container is exhausted, it is desirable that a spring be used to keep the valve seated.

An important feature in the construction of the valve is the location and arrangement of the opening 20 formed in the end 14 of the valve which is closed by the walls of the restricted chamber 3. In order for the gas to escape from the receptacle 9 it must pass through the passage 8, the chamber 2 and through the passages 20 and 19 in the end of the valve body. It is to be noted that in so doing the gases are not required to pass over the annular valve seat 4. This is important because in high pressure gases there is a tendency for the valve seats to become cut and scored by the passage of the high pressure gases thereover. Thus it is seen that the gases pass directly from the chamber through the passage in the valve body. When, however, the valve is seated it is to be noted that there is a double closure formed for the gases to prevent the escape thereof, one of said closures being formed by the annular shoulder 15 of the valve body being seated on the valve seat 4 of the casing, the other closure being formed when the end 14 of the valve body is moved inwardly of the restricted passage 3.

While there has herein been shown but one preferred form of the construction, certain changes and modifications may be made thereof without departing from the spirit and scope of this invention.

Having thus described the invention, what I claim as new is:

1. A stemless high pressure valve comprising a casing having a chamber therein, a threaded neck extending from said casing having a passageway extending therethrough in communication with said chamber, a restricted outlet passage at one end of said chamber, an annular beveled portion connecting the chamber with the restricted passage and forming a valve seat, a plug threaded in the other end of said chamber having a passage therethrough communicating with said chamber, a recess in one end of said plug, a valve body having one end thereof guided within said recess and the other end thereof guided within said restricted passage, a portion of the end guided within the recess of the plug being cut away to form a passage at all times between the passage within the plug and the chamber of the valve, the other end of the valve body guided within the restricted passage having a passage therein extending laterally of the valve body and through its end said passage being normally closed by the walls of the restricted chamber, and a beveled annular shoulder on said valve body adapted to be seated on the annular beveled portion of the valve chamber.

2. A stemless high pressure valve comprising a casing having a chamber therein, a removable plug having a passage therethrough positioned at one end of the chamber, a restricted passage at the other end of said chamber, a beveled edge connecting the chamber and the restricted passage and forming a valve seat, an inlet communicating with said chamber, and a valve body positioned in said chamber having one end thereof guided in the opening extending through said plug and the other end thereof guided in the restricted passage at the other end of said chamber, the said valve body having an annular beveled shoulder to contact with the valve seat, a portion of the valve body extending within the restricted chamber having a passage therein, one end of which is closed by the walls of the restricted passage when the valve is seated, the other end being open when the valve is seated.

3. A stemless high pressure valve comprising a casing having a chamber therein, an inlet and an outlet therefor, the outlet consisting of a restricted passage, a plug having a passage extending therethrough positioned at one end of the chamber, a safety disk closing the outer end of said plug passage, and a valve body movable within said chamber having one end thereof cut away and guided within the plug, the other end thereof guided within the restricted passage, the outer end of said valve body extending outward of the restricted passage, the said valve body having a shoulder forming a valve seat to limit movement of the valve body in one direction, the said valve body being provided with a passageway extending inwardly from the end thereof and having an opening in the side thereof intermediate the ends of the restricted passage so that the valve body must receive a limited movement in order to permit communication between the passage within the valve body and the chamber within the casing.

EDWARD E. GARLAND.